UNITED STATES PATENT OFFICE 2,468,075

PLANT GROWTH COMPOSITIONS

David W. Jayne, Jr., Old Greenwich, Harold M. Day, Cos Cob, and Kenneth G. Nolan, Noroton Heights, Conn., assignors to American Cyanamid Company, New York, N. Y., a corporation of Maine No Drawing. Application December 7, 1945, Serial No. 633,553

9 Claims. (Cl. 71—2)

The present invention relates to plant husbandry, and more particularly to plant growth-regulating compositions and methods of regulating the growth characteristics of plants.

It has been discovered that the thiazyl compounds of the formula

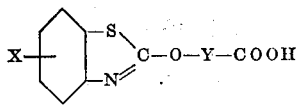

in which X stands for a member of the group consisting of hydrogen and a halogen, and Y is a bivalent hydrocarbon radical having less than nine carbon atoms, possess remarkable and most unexpected plant growth-regulating properties.

In the above formula, although X may represent any one of the halogens, the preferred ones are chlorine and bromine. In regard to the nuclear halogenated ring, it is preferred that the number of halogen substituents be not greater than three. When the more highly halogenated compounds are used injury to certain types of plants may occur.

As illustrating the diversity of compounds which may be used for the purposes of this invention, the following may be mentioned:

Benzthiazyl ether of glycollic acid
5-brombenzthiazyl ether of glycollic acid
5,6-dichlorbenzthiazyl ether of glycollic acid
Benzthiazyl ether of lactic acid
5-chlorbenzthiazyl ether of hydracrylic acid
Benzthiazyl ether of γ-hydroxybutyric acid
Benzthiazyl ether of α-hydroxyvaleric acid
5-brombenzthiazyl ether of α-hydroxyvaleric acid
Benzthiazyl ether of α-hydroxycaproic acid
Benzthiazyl ether of α-hydroxycaprylic acid
5-chlorbenzthiazyl ether of α-hydroxycaprylic acid Thiazyl compounds of the above type may be conveniently and economically synthesized from available raw materials. For example, the benzthiazyl ether of glycollic acid is obtained by reaction of the sodium salt of 2-hydroxybenzothiazole with sodium chloracetate, followed by acidification.

It is to be understood that the salts, esters, and amides of the above compounds which may be readily prepared by conventional methods and which possess substantially similar plant growth-regulating properties, are included in the present invention by reason of equivalency.

For the purpose of this invention it will also be understood that the term "plant" as used herein and in the appended claims is intended to include seeds and tubers.

The compounds of this invention may be used in a variety of ways to regulate the growth characteristics of the plant. For example, they may be applied to tubers and the like for regulating germination, to stimulate or inhibit sprouting, or to stimulate development of roots; they may be applied to fruit trees to delay or prevent preharvest drop; they may be applied to cuttings and transplanted plants or the roots thereof to stimulate root activity; they may be applied to ornamental plants to delay fall of leaves and needles, and they may be used to chemically thin the blossoms of fruit trees or other plants.

Another method of regulating the growth characteristics of the plant consists of incorporating the present compounds in fertilizers and plant foods such as, for example, bone meal, peat, phosphate, potash and urea products, or in oil or water insecticidal or fungicidal sprays and the like.

Different compositions may be employed in the application of these plant growth-regulating compounds with or without carriers. For instance, a stock solution may be prepared by dissolving the compound in an organic solvent. This solution may then be applied in the form of an aqueous emulsion of suitable dilution. Wetting agents and/or adhesives may be included in these emulsions. Suitable solvents for the compounds include diacetone alcohol, cyclohexanone, and the low molecular weight monohydric alcohols, glycols, Cellosolves and phthalates esters. The compounds may also be incorporated in oils, fats, or similar vehicles such as lanolin, paraffin oil, olive oil, hydrogenated vegetable oils or nonvolatile petroleum oils containing not more than about 15 per cent of unsaturated hydrocarbons, or in a finely divided inert material such as talc, bentonite, chalk, cotton-seed meal, fuller's earth, wood flour, pumice or silica. The preferred ratio of regulant to carrier when applied to plants is from one to one hundred parts per million.

Among the demonstrable growth modifying characteristics, perhaps the ability of the present compounds to prevent or delay abscission of flowers, fruits and leaves is the most spectacular.

The Coleus petiole technique previously described by Gardner and Cooper, The Botanical Gazette, vol. 105, No. 1, Sept., 1943, was used for this purpose. The method consisted in spraying the Coleus plant (variety Trailing Queen) with a finely dispersed aqueous emulsion of the compound under test. Two days following the application of the spray, the leaf blades were removed from the selected petioles. Abscission records were dated from the day the blades were removed. The aqueous emulsion was prepared by diluting a stock solution consisting of 0.5% of the compound in diacetone alcohol.

The tests listed in Tables 1 and 2 illustrate the surprisingly high activity of the compounds of this invention in delaying petiole drop. A comparison is made of the present compounds with $\alpha$-naphthalene acetic acid, a known plant regulant. Aqueous emulsions of these compounds are particularly effective in concentrations ranging from 25 to 100 parts per million.

ity while the benzthiazyl ether of glycollic acid is highly active. For the purpose of clarity, the formulas of the compounds listed in the table are given as follows:

Benzthiazyl ether of glycollic acid

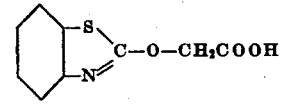

Benzthiazyl ether of thioglycollic acid

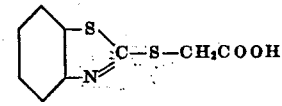

5-chlorbenzthiazyl ether of thioglycollic acid

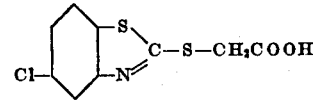

Table 1

| Compound | Conc., P. P. M. | No. of Petioles on Plants | Per Cent Drop of Petioles, No. of Days | | | | | |
|---|---|---|---|---|---|---|---|---|
| | | | 4 | 6 | 9 | 11 | 13 | 16 |
| Water check | | 54 | 75.9 | 90.7 | 94.4 | 100 | | |
| $\alpha$-naphthalene acetic acid | 100 | 62 | 0 | 0 | 16.1 | 32.2 | 50.0 | 66.1 |
| Benzthiazyl ether of glycollic acid | 100 | 56 | 0 | 0 | 3.6 | 10.7 | 32.1 | 48.2 |
| Do | 50 | 54 | 0 | 14.8 | 29.6 | 38.9 | 72.2 | 74.1 |
| Do | 25 | 60 | 13.3 | 51.7 | 76.7 | 78.3 | 81.7 | 91.7 |

Table 2

| Compound | Conc., P. P. M. | No. of Petioles on Plants | Per cent Drop of Petioles, No. of Days | | | |
|---|---|---|---|---|---|---|
| | | | 3 | 5 | 6 | 7 |
| Water check | | 38 | 100 | | | |
| $\alpha$-naphthalene acetic acid | 100 | 44 | 0 | 13.6 | 25.0 | 34.0 |
| Benzthiazyl ether of glycollic acid | 100 | 42 | 0 | 0 | 2.4 | 11.9 |
| "Lorol"[1] ester of benzthiazyl ether of glycollic acid | 100 | 38 | 0 | 2.6 | 10.5 | 13.1 |
| Methyl ester of benzthiazyl ether of glycollic acid | 100 | 42 | 0 | 0 | 0 | 11.9 |
| Potassium salt of benzthiazyl ether of glycollic acid | 100 | 42 | 0 | 2.4 | 19.0 | 21.4 |
| 5-brombenzthiazyl ether of glycollic acid | 500 | 32 | 0 | 0 | 0 | 6.2 |

[1] Lorol alcohol is a product of the Du Pont Company and comprises a mixture of straight-chain, even-numbered carbon atom alcohols ranging from 8 to 16 carbon atoms with lauryl alcohol preponderating.

The activity of the compounds of this invention may be attributed to the

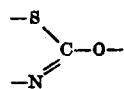

linkage in the molecule. The tests given in Table 3 verify this assumption inasmuch as the benzthiazyl ether of thioglycollic acid, the 5-chlorbenzthiazyl ether of thioglycollic acid, the benzoxazyl ether of thioglycollic acid and the benzoxazyl ether of glycollic acid show substantially no activ- Benzoxazyl ether of glycollic acid

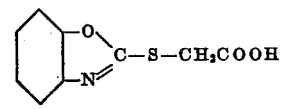

Benzoxazyl ether of thioglycollic acid

Table 3

| Compound | Conc., P. P. M. | No. of Petioles on Plants | Per cent Drop of Petioles, No. of Days | | | | |
|---|---|---|---|---|---|---|---|
| | | | 4 | 5 | 7 | 9 | 19 |
| Water check | | 36 | 55.5 | 91.6 | 100 | | |
| Benzthiazyl ether of glycollic acid | 500 | 38 | 0 | 0 | 0 | 0 | 0 |
| Benzthiazyl ether of thioglycollic acid | 500 | 32 | 100 | | | | |
| 5-Chlorbenzthiazyl ether of thioglycollic acid | 500 | 36 | 100 | | | | |
| Benzthiazyl ether of glycollic acid | 100 | 84 | 0 | 2.4 | 27.4 | 59.5 | |
| Benzoxazyl ether of glycollic acid | 100 | 95 | 60.0 | 85.2 | 95.7 | 100 | |
| Benzoxazyl ether of thioglycollic acid | 100 | 90 | 65.5 | 90.0 | 100 | | |

The present growth-regulating compounds may be employed effectively both in aqueous and oil-containing sprays and in dust mixtures to retard the abscission of fruits such as apples, pears, peaches, grapes, etc., before harvest. With such mixtures there may be incorporated other materials serving to improve contact and coverage on the tree or plant.

Williams early red apple trees were sprayed with aqueous emulsions of α-naphthalene acetic acid and the benzthiazyl ether of glycollic acid. Daily drop counts were made and after the fruit was picked, the daily cumulative drop was expressed as percentage drop. Table 4 shows the per cent drop cumulative at the end of the sixth day.

Table 4

| Compound | Conc., P. P. M. | Per cent Drop of Apples |
|---|---|---|
| Benzthiazyl ether of glycollic acid | 5 | 1.9 |
| α-Naphthalene acetic acid | 5 | 1.7 |
| Untreated |  | 19.5 |

The present compounds are also particularly adapted to the production of parthenocarpic or seedless variety of fruit and vegetables such as cucumbers, peppers, tomatoes, eggplant, squash, etc. This may be accomplished by spraying the flower buds several times while flowering continues with a dilute aqueous suspension of the compound. Reference is here made to applicants' copending application Serial No. 633,554, filed December 7, 1945.

While the invention has been described with particular reference to specific embodiments, it is to be understood that it is not to be limited thereto but is to be construed broadly and restricted solely by the scope of the appended claims.

We claim:

1. A thiazyl compound having the formula

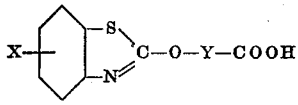

in which X stands for a member of the group consisting of hydrogen and a halogen, and Y is a bivalent hydrocarbon radical having less than nine carbon atoms.

2. A thiazyl compound having the formula

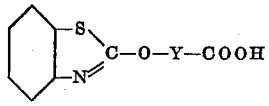

in which Y is a bivalent hydrocarbon radical having less than nine carbon atoms.

3. The benzthiazyl ether of glycollic acid having the following formula

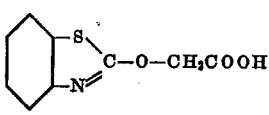

4. The method which comprises treating a plant with a thiazyl compound having the formula

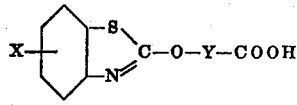

in which X stands for a member of the group consisting of hydrogen and a halogen, and Y is a bivalent hydrocarbon radical having less than nine carbon atoms.

5. The method of claim 4 wherein said thiazyl compound is a thiazyl compound having the formula

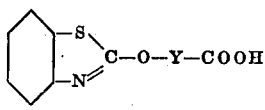

in which Y is a bivalent hydrocarbon radical having less than nine carbon atoms.

6. The method which comprises treating a plant with the benzthiazyl ether of glycollic acid.

7. A plant growth-regulating composition containing as an active ingredient a thiazyl compound having the formula

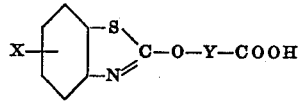

in which X stands for a member of the group consisting of hydrogen and a halogen, and Y is a bivalent hydrocarbon radical having less than nine carbon atoms, and an inert carrier therefor, the said carrier being present in major amount and the amount of said thiazyl compound present in the said composition being sufficient to impart plant growth-regulating characteristics thereto.

8. The plant growth-regulating composition of claim 7 wherein said thiazyl compound is a thiazyl compound having the formula

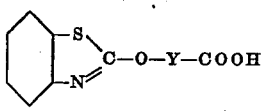

wherein Y is a bivalent hydrocarbon radical having less than nine carbon atoms.

9. The plant growth-regulating composition of claim 7 wherein said thiazyl compound is the benzthiazyl ether of glycollic acid.

DAVID W. JAYNE, Jr.
HAROLD M. DAY.
KENNETH G. NOLAN.

REFERENCES CITED

The following references are of record in the file of this patent:

UNITED STATES PATENTS

| Number | Name | Date |
|---|---|---|
| 1,962,109 | Alvord | June 5, 1934 |
| 2,322,761 | Lontz | June 29, 1943 |
| 2,349,772 | Ter Horst | May 23, 1944 |
| 2,396,468 | Ladd | Mar. 12, 1946 |
| 2,396,513 | Jones | Mar. 12, 1946 |